(12) United States Patent
Mahidhara

(10) Patent No.: US 9,763,436 B2
(45) Date of Patent: Sep. 19, 2017

(54) HORSESHOE HAVING RETAINING CLIPS AND PROTECTIVE PLASTIC CAPS ON THE CLIPS

(71) Applicant: Murali Mahidhara, Pittsburgh, PA (US)

(72) Inventor: Murali Mahidhara, Pittsburgh, PA (US)

( * ) Notice: Subject to any disclaimer, the term of this patent is extended or adjusted under 35 U.S.C. 154(b) by 145 days.

(21) Appl. No.: 14/756,081

(22) Filed: Jul. 29, 2015

(65) Prior Publication Data

US 2017/0027149 A1  Feb. 2, 2017

(51) Int. Cl.
*A01L 1/04*  (2006.01)

(52) U.S. Cl.
CPC ....................... *A01L 1/04* (2013.01)

(58) Field of Classification Search
CPC ..... A01L 1/00; A01L 1/02; A01L 1/04; A01L 3/00; A01L 3/02; A01L 7/00
USPC .............................. 168/4, 18, 19, 20, 21, 23
See application file for complete search history.

(56) References Cited

U.S. PATENT DOCUMENTS

| 342,665 | A | * | 5/1886 | Wilcox | A01L 1/00 168/25 |
|---|---|---|---|---|---|
| 6,688,401 | B2 | | 2/2004 | Smith | |
| 2014/0231100 | A1 | * | 8/2014 | Ford | A01L 1/02 168/12 |
| 2016/0157474 | A1 | * | 6/2016 | Broadus | A01L 3/00 168/17 |

FOREIGN PATENT DOCUMENTS

CH   DE 3517119 A1 *  11/1986  ............... A01L 3/00

OTHER PUBLICATIONS

English-language translation of DE 3517119 A1.*

* cited by examiner

*Primary Examiner* — Lisa L Tsang
(74) *Attorney, Agent, or Firm* — Rama B Nath

(57) ABSTRACT

A horseshoe that has vertical metallic retaining-clips to deter dislodging of the horseshoe after installation uses a safety feature: a protective safety cap to cover the open end of each retaining-clip. The safety cap comprises a sheath that is tightly fastened to the corresponding retaining clip. The safety cap has an extended inside axial length that is longer than the vertical height of its corresponding retaining-clip whereby, if a dislodged or uninstalled horseshoe having the retaining-clips is stepped on by a horse-hoof, the extended axial length of the cap folds on itself and prevents the vertical retaining-clip from causing a penetrating injury to the hoof-underside. The safety cap could be closed at its top or open fully/partly and comprises plastic material that is flexible but tough. Preferably the safety cap is fastened to the corresponding retaining clip by riveting. Alternatively, the safety cap may be glued to the retaining clip.

14 Claims, 2 Drawing Sheets

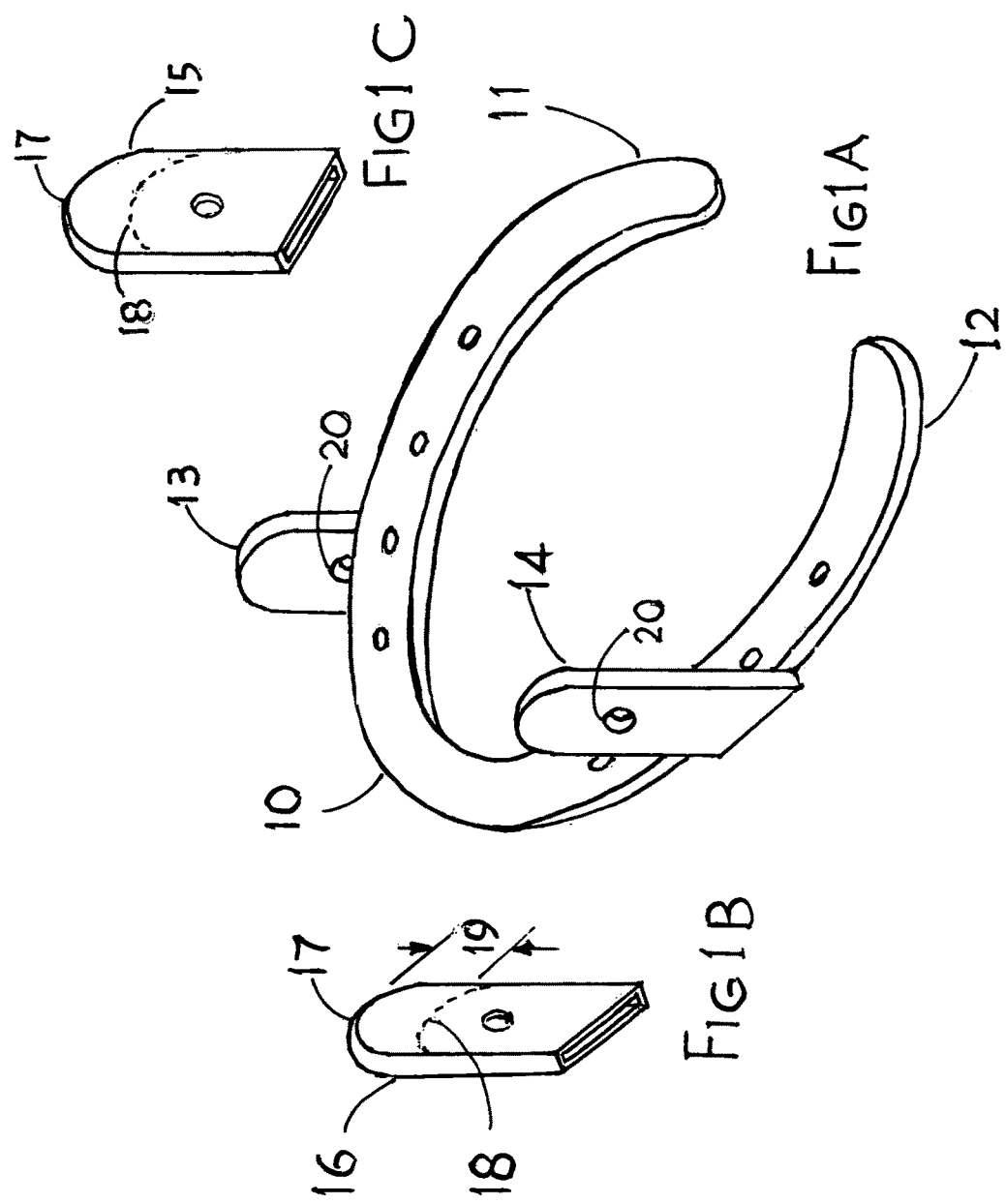

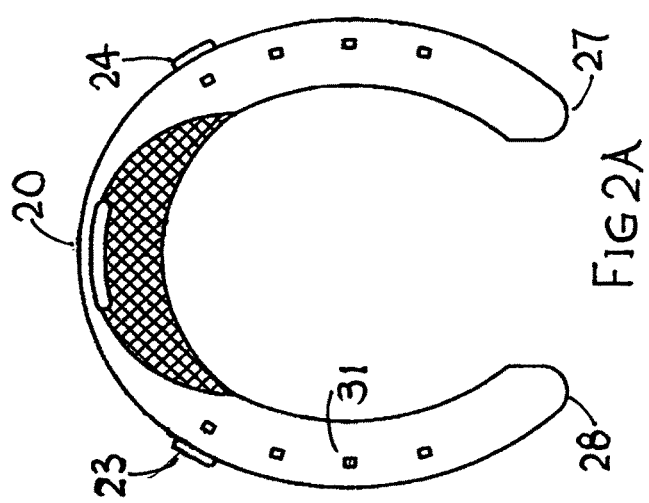
FIG 2A
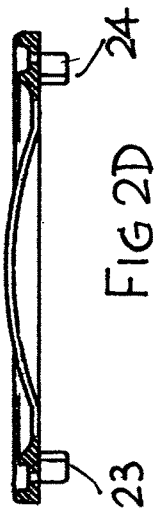
FIG 2D
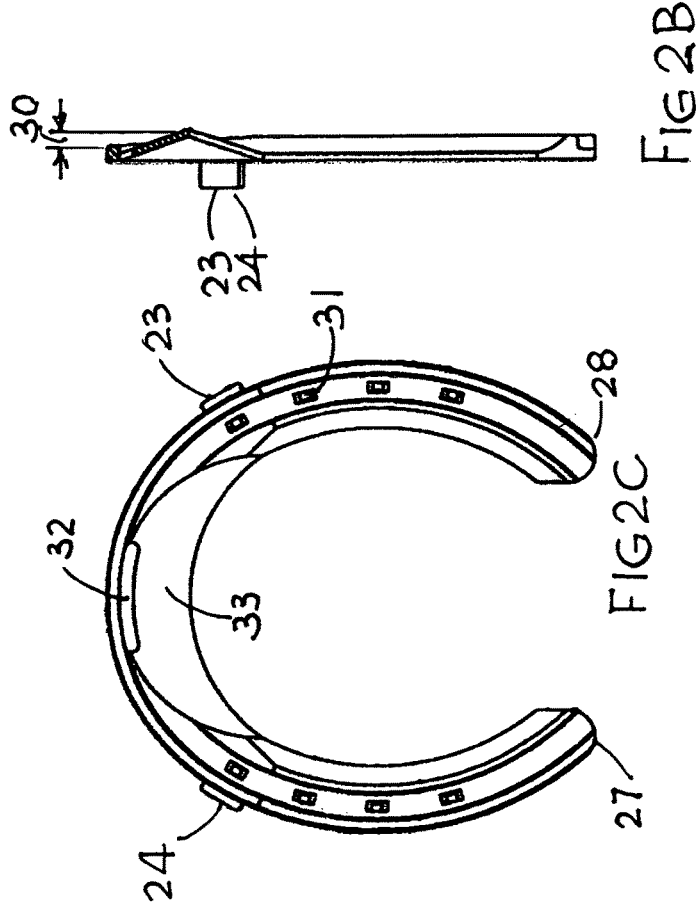
FIG 2B
FIG 2C
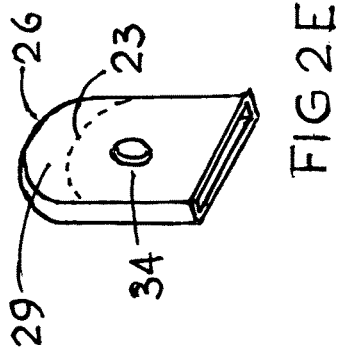
FIG 2E

HORSESHOE HAVING RETAINING CLIPS AND PROTECTIVE PLASTIC CAPS ON THE CLIPS

FIELD OF THE INVENTION

The present invention is directed to a horseshoe, and more particularly to a race-horseshoe with metallic construction and including metallic clips that serve to prevent/deter the installed horseshoes from being easily dislodged from the horse's hoof.

BACKGROUND OF THE INVENTION

It has been the object of many horseshoe designers and farriers to provide a horseshoe which is hoof-friendly. Typically, the horseshoes installed on the rear legs of the race-horse are provided with retaining metallic-clips. After the installation of the horseshoe that has metallic clips, it is not uncommon for the horse to sense the shoe as an encumbrance and consequently try to get rid of the shoe by kicking or doing whatever it takes to dislodge the shoe. If the horseshoe is dislodged and is in its upright use-position with the metallic clips typically with a vertical orientation, and if the horse steps on the dislodged shoe, the metallic clips are capable of piercing the underside of the horse's hoof, thereby causing injury and rendering the horse temporarily dysfunctional for racing purposes. This is an issue known to farriers and other horse-racing personnel. In a horse-racing environment, any hoof injury translates into temporary financial loss and inconvenience, with the added possibility of hoof-infection and further undesirable consequences. It is therefore of paramount importance to obviate any injury that may be caused to the hoof-underside by possible unintended penetration of the hoof underside by metallic clips from a dislodged horseshoe either in the horse's stall or elsewhere.

Thus far, the above injury-issue either does not seem to have been addressed in the field of horseshoes for horse-racing, or, a reasonable solution to the penetration-injury problem described supra has not become available. There is thus a need for a solution to address the injury-issue to the hoof, discussed supra. The preferred solution needs to be simple, economical and should be capable of being implemented on any horseshoe design that has metallic retaining clips.

Despite the availability of horseshoe designs providing shock absorption, flexibility and such features, there is still a need for obviating the possibility of penetration-injury caused by metallic clips, by providing a solution that is characterized by simplicity, economy and including a feature that offers universal applicability.

SUMMARY OF THE INVENTION

The invention is generally directed to providing tight-fitting pliable protective plastic caps over metallic clips that project vertically from the horseshoe side. Each plastic cap of the invention is generally in the form of a tight sheath disposed on each metallic-clip to cover the clip, the sheath being fastened to the cap, preferably by riveting. According to the present invention, the plastic cap is flexible but tough and is of such an axial length that after installation and permanent fastening, there is a free unoccupied length of the plastic cap above the top of the metallic clip and inside of the plastic cap. Because of the free unoccupied length of the protective plastic cap, in the event that the horseshoe gets accidentally dislodged and is stepped on by a horse, the free unoccupied length of the plastic cap simply folds on itself and deters the tip of the metallic clip from piercing the cap, thus avoiding exposing the tip of the metallic clip which would potentially cause a piercing-injury to the underside of the horse-hoof. Each protective pliable plastic cap is fastened to its metallic clip counterpart preferably by riveting, or, by gluing as an alternative. Expediently, the plastic cap may be of a material which is tough, wears well and yet is pliable. The protective plastic cap may be of any suitable color to make it visible; or, it may be transparent to avoid being conspicuous.

In one form, the invention resides broadly in a horseshoe having retaining metallic clips projecting vertically up from the horseshoe, wherein each metallic-clip includes a non-removable protective plastic cap provided in the form of a sheath disposed fastened to and covering the metallic-clip, the sheath having such an inside axial length that would leave a predetermined vertical space/gap above the top-tip of each metallic-clip.

The properties required of the preferred material for the protective plastic cap include relatively low-cost, flexibility and toughness, as well as the ability to be quickly fastened/affixed to the metallic retaining clips.

In another form the invention resides in a horseshoe of the type having a generally U shaped body with a front region and an open back end, said horseshoe having at least two spaced vertically oriented metallic retaining-clips projecting vertically upwards from a horseshoe-side substantially in said front region of the horseshoe, said retaining clips being meant for preventing unintended dislodging of an installed horseshoe, each said metallic-clip having a known first vertical length, the horseshoe being characterized in that each metallic-clip includes a protective plastic cap in the form of a flexible and tough sheath disposed fastened by riveting to and tightly covering said metallic-clip, said cap/sheath having an inside axial length longer than said known first vertical length thus creating a vertical space/gap and a predetermined protruding length of said protective plastic cap above a top-tip of each said metallic-clip, whereby, if an uninstalled or dislodged horseshoe including said protective plastic caps is stepped on by a horse hoof, said predetermined protruding length of said fastened protective plastic cap folds on itself and deters any accidental penetrating-injury to said horse hoof by said vertically oriented metallic retaining-clips. Any suitable riveting material such as aluminum, copper, or steel or a chosen alloy is acceptable for the rivets.

BRIEF DESCRIPTION OF THE DRAWING

A more detailed understanding of the invention may be had from the following description of preferred exemplary embodiments, not intended to be limiting, and to be understood in conjunction with the accompanying drawing wherein:

FIG. 1A illustrates an unassembled view of a generic type of metal horseshoe with two retaining clips.

FIGS. 1B and 1C show plastic caps shown before assembly;

FIGS. 2A, 2B, 2C, 2D illustrate views of one embodiment of the inventive horseshoe with two metal clips. and, FIG. 2E shows one view of the inventive plastic cap before assembly.

DETAILED DESCRIPTION OF EMBODIMENTS

A more detailed understanding of the invention may be had from the following description of preferred embodiments which are exemplary and not intended to be limiting, and to be understood in conjunction with the accompanying drawings that illustrate by way of example the principles of the invention. While the invention is described in connection with such embodiments, it should be understood that the invention is not limited to any particular embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

In the following detailed description of the preferred embodiments, reference is made to the accompanying drawings in which are shown by way of illustration specific embodiments in which the invention may be practiced. The embodiments included herein are described in sufficient detail to enable those skilled in the art to practice the invention, and it is to be understood that other embodiments may be utilized including structural changes that may be made without departing from the scope of the present invention. The specific description of the embodiments given herein is by way of example only, and is therefore not to be taken in a limiting sense, and the scope of the present invention is defined only by the claims and their equivalents.

FIG. 1A shows a generic type of horseshoe with a U shaped body 10 with left and right wings 11, 12. Structural details of the horseshoe not related to the present invention including details of how to mount the horseshoe, are not described here least the present invention should be obscured. As illustrated, FIG. 1A shows two retaining clips 13 and 14 which may be integral with the body of the horseshoe. As referenced earlier, the retaining clips 13, 14 are generally vertically oriented in the use-position of the horseshoe; the retaining clips abut against the horse hoof on the outside, and serve to deter easy-dislodging of the installed horseshoe. The present invention employs protective caps to cover the retaining clips 13, 14. The illustration in FIG. 1 shows protective caps 15, 16, which are made of material that is flexible but tough. In the event that the installed horseshoe becomes dislodged and separated from the horse-hoof, the present invention obviates the possibility of penetration-injury to the underside of the horse-hoof by virtue of the protective plastic caps 15 and 16 that are illustrated in FIGS. 1C and 1B as explained in greater detail hereinafter. It is to be noted that the caps 15 and 16 form a relatively tight fit circumferentially on the clips 13, 14, and are fastened, preferably by riveting, to the respective clips 13 and 14. Optionally, the fastening may comprise gluing. Significantly, the axial length of the inside of each plastic cap 15/16 is deliberately made longer than the vertical length of the retaining clip, thus creating a space/cavity 19 (above the tip of each clip 13, 14) to the extent of about 12 mm or ½ inch in length, for example. The space/cavity is an overhang and could be chosen to be longer or shorter as needed, so long as the overhang is able to fold on itself when stepped on vertically downwards. The plastic caps may have a wall thickness in the range of 1-3 mm for example, or any other desired thickness that allows easy flexing of the plastic caps 15/16. The space/cavity 19 is unoccupied by the metallic retaining clips 13/14, and may have an axial length range of 10-15 mm, for example. Other convenient and practical length-dimensions for the cavity/overhang may be chosen as desired, so long as the top-part of the plastic cap is capable of folding on itself when vertically stepped on, thus covering the tip of the metallic retaining clips 13/14, thereby rendering the tips to be ineffective to cause a penetrating injury. Expediently, the retaining clips 13, 14 may be rounded off at their top, but the rounding off per se may not preclude the potential of the retaining clips to cause penetrating injury to the hoof underside. Significantly as aforesaid, according to the present invention, in the assembled state of each of the plastic caps 15 and 16 on the respective clips 14 and 15, there is a deliberate clear space/gap in the cavity 19 between the top tip 18 of each clip 13, 14 and the top end of the corresponding plastic cap 15, 16. In one form, the top end of the protective plastic cap may be a dead-end or a closed end 17. It is envisaged that the invention will work as intended even if the top end of the protective plastic cap is open without being a dead end, or is open but tapered. Consequently and expediently, if/when a dislodged or uninstalled horseshoe 10 along with the fastened inventive-protective plastic caps 15/16 happens to be stepped on accidentally, the space/cavity part (19) of the plastic caps (that is an overhang) beyond the top-ends of the retaining clips folds on itself to cover the tips of the vertical retaining clips, thus rendering said metallic tips to be incapable of causing any penetrating injury to the underside of the horse-hoof. In other words, in the present invention the metallic tips of the retaining clips are not exposed, cannot penetrate, and do not have the capability of causing any piercing injury to the underside of the horse-hoof. FIGS. 1B and 1C show the dotted line 18 that represents the tip of the respective metallic retaining clip after assembly, thus showing the gap 19 after the protective cap is assembled on its corresponding metallic retaining clip 13/14. Also shown in FIG. 1 are rivet holes 20 provided in the metallic retaining clips 13/14 to facilitate fastening by riveting of the protective plastic caps 15/16 to the corresponding retaining clip 13/14 respectively. Advantageously, the axial length of the cavity 19 may be chosen suitably considering at least the wall-thickness of the plastic caps 15, 16, and the mechanical properties of the material of the plastic cap 15, 16. In general, it is desirable that the plastic caps 15/16 are made of pliable material that does not break when bent, is tough to penetrate and yet is flexible. It is also noted that during the fastening-assembly (by riveting or gluing) of the caps 15/16 on the corresponding retaining clips 13,14, the open ends of the caps 15/16 reach their bottom-most position on the respective retaining clips and leave a clear unoccupied cavity-length 19 above the tips of the retaining clips 13, 14.

Any suitable material for the rivets may be used, such as for example aluminum or copper or any alloy that is suitable for rivet material. If the fastening is done by gluing instead, a quick-drying glue may be preferred. In general, any glue may be used for gluing the plastic caps 15, 16 to the corresponding retaining clips 13, 14, so long as the glue is compatible with metal and the plastic material of the caps. Where the fastening is done by gluing, there may be no need for the rivet-apertures either in the retaining clips or the plastic caps. Preferably, if the fastening is made using glue, the cavity 19 is made glue-less to enable easy flexing and folding of the top portion of the plastic cap in the event that horseshoe is uninstalled or becomes dislodged which would have the potential of causing a penetration-injury to the hoof underside. To this end, expediently, for fastening using glue, the glue needs to be sparingly applied so that no excess glue fills the cavity 19.

Suitable tough and flexible materials that lend themselves to be made into protective plastic caps in the present invention are known to those skilled in the art. For example, plasticized PVC is a relatively low-cost material and has the properties of both flexibility and toughness; plasticized PVC can be made to be transparent or opaque according to the user's choice and is available with the commercial names of Welvic® and Varian®. The foregoing materials are merely examples for the material of the protective plastic cap 15/16. The plastic cap 15/16 may be made of injection moulded/blow moulded/vacuum-formed thermoplastics known under one of the commercial names Acrylic, Polypropylene, Polystyrene, Polythene, and PVC. In particular, it is noted that low density Polythene (known as LDPE) is tough and flexible and is available under the commercial names Alkathene®, Escorene® and Novex®. Other alternative materials suitable for the plastic cap, with the desirable attributes of flexibility and toughness are available in the market and are known to those who are skilled in the art. Any convenient method of manufacturing the plastic cap 15/16 is acceptable.

FIGS. 2A, 2B and 2C illustrate another example of a horseshoe having a generally U shaped body 20, and left and right wings 27, 28 having bottom surfaces on a horizontal bottom plane of the horseshoe. As shown, the horseshoe includes a crescent shaped spring element 33 which includes a downward projection 30 projecting below the horizontal bottom plane during an unstressed condition of the spring element 33. Detailed functioning of the crescent shaped spring element 33 may be learnt from U.S. Pat. No. 8,881,838 B2. The illustration in FIGS. 2A-2D shows vertical retaining clips 23, 24 on the top of each of which is to be assembled a protective plastic cap 26 that is shown in FIG. 2E. The plastic caps have flexibility and toughness, and are axially longer inside than the length of the retaining clips 23, 24. FIG. 2E shows a protective plastic cap 26 which, as explained in the context of FIGS. 1A-1C, has such an inside axial length that provides a clear cavity 29 beyond the tip of the retaining clips after assembly. It is also noted that FIG. 2E shows an exemplary location 34 for a rivet that fastens the protective plastic cap to its corresponding retaining clip. By virtue of the additional inside axial length of the plastic caps, the upper part of the plastic caps folds and bends if/when the dislodged horseshoe is accidentally stepped on, thus ameliorating any penetrating injury to the underside of the horse-hoof by the vertically oriented retaining clips 23, 24.

As will be intelligible to those skilled on the art, the horseshoe illustrated in FIGS. 2A-2D shows typical nail holes 31 for mounting the horse-shoe to the horse-hoof. FIG. 2C further shows additional features including a crescent shaped spring element 33, and an optional slit 32 in the toe region of the horseshoe, these features not being part of the present invention. The crescent shaped spring element in its unstressed state projects below the bottom horizontal plane of the horseshoe by a dimension 30, said dimension not being overly relevant to the thrust of the present invention.

In all the embodiments and their modifications in the present inventions, the material for the horseshoe might comprise suitable metallic material chosen from titanium, spring steel alloy, or ferrous material such as a suitable grade of steel, or spring steel. The horseshoe might comprise a U shaped body obtained by a forging operation using precipitation hardened spring steel 17-4 PH. Any other material for the horseshoe is acceptable so long as the horseshoe has the equivalent of the metallic retaining clips 23, 24 that would on their own have the potential of causing a penetration injury to the underside of the horse-hoof.

Preferred embodiments described above selectively offer one or more of the following advantages:

1. By virtue of the preferred properties of the protective cap material, the cap will not crack and break off.
2. The cap material being flexible yet tough, the additional axial length of the protective cap folds on itself if/when the horseshoe with the protective cap is stepped on, so that the ends of the metallic retaining clips are not exposed thereby avoiding any penetrating injury.
3. The protective plastic caps may be fastened in place on the respective metallic retaining clips by riveting, which may be done prior to the shipment of the horseshoe. Alternatively, the protective plastic caps may be assembled on the respective retaining clips in-situ before the horseshoe installation.
4. The fastening of the protective plastic caps of the invention may be done preferably by riveting with suitable rivets. Alternatively, the fastening may be done by gluing, in which case glue may be applied sparingly to the inside of the protective plastic cap so that there is no excess glue that might undesirably fill the cavity above the tips of the metallic retaining clips.
5. The tope ends of the protective plastic caps may be closed ends, or may be open. Alternatively, the top ends of the plastic caps may be open, with the cavity tapering down towards the top end of the protective cap.

In the foregoing detailed description of embodiments of the invention, various features may have been grouped together in a single exemplary embodiment for the purpose of streamlining the disclosure. The above method of disclosure is not to be interpreted as reflecting an intention that the claimed embodiments of the invention require more features than are expressly recited in each claim. Rather, as the following claims reflect, inventive subject matter may lie in less than all shown features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," or vertical, etc., if used, are merely descriptive, and are not intended to impose limited requirements or limited orientation on their objects.

The invention claimed is:

1. A horseshoe with a toe region and an open back end, said horseshoe having at least two spaced vertically oriented metallic retaining-clips projecting vertically upwards from outer sides of the horseshoe substantially in said toe region, said retaining-clips deterring unintended dislodging of an installed horseshoe on a horse hoof, each of said metallic retaining-clips having a first vertical length, wherein each of said metallic retaining-clips includes a protective cap that is a flexible and tough sheath disposed fastened to and tightly surrounding all sidewalls of each of said metallic retaining-clips, said sheath having an inside axial length longer than said first vertical length, thus causing an empty space/gap and a hollow sheath-overhang above a top-tip of each of said metallic retaining-clips, the empty space/gap extending in a direction away from a top-tip of each of said metallic retaining-clips and along a longitudinal axis of each of said metallic retaining-clips, whereby, if said horseshoe is uninstalled or becomes dislodged after installation and is stepped on by said horse hoof, said hollow sheath-overhang of said fastened protective cap folds on itself and deters any accidental penetrating-injury to an underside of said horse hoof by said vertically oriented, metallic retaining-clips.

2. The horseshoe as in claim 1 wherein said protective cap has an opening where said hollow sheath-overhang of said sheath ends.

3. The horseshoe as in claim 1 wherein said protective cap has a closed end where said empty space/gap ends.

4. The horseshoe as in claim 1 wherein each said sheath of said protective cap is made of flexible plastic and includes a fastening-rivet fastening the protective cap to its corresponding vertical metallic retaining-clip.

5. The horseshoe as in claim 1 wherein each said sheath includes glue applied to fasten said each sheath to its corresponding vertical metallic retaining-clip.

6. The horseshoe as in claim 1 wherein said sheath has a wall thickness of approximately 1-3 millimeters and a length of said hollow sheath-overhang of said protective cap is approximately 10-15 millimeters.

7. A horseshoe of the type having a generally U shaped body with a toe region and an open back end, said horseshoe having at least two spaced, vertically oriented, metallic retaining-clips projecting vertically upwards from outer sides of the horseshoe substantially in said toe region of the horseshoe, said retaining-clips preventing unintended dislodging of an installed horseshoe on a horse hoof, each of said metallic-clips having a first vertical length, wherein each of said metallic-clips includes a protective plastic cap that is a flexible and tough sheath disposed fastened by riveting to and tightly surrounding all sidewalls of each of the metallic retaining-clips, said sheath having an inside axial length longer than said first vertical length, thus causing an empty space/gap and a hollow sheath-overhang in an axial direction above a top-tip of each of said metallic retaining-clips, the empty space/gap and hollow sheath-overhang extending in a direction away from a top-tip of each of said metallic retaining-clips and along a longitudinal axis of each of said metallic retaining-clips, whereby, if said horseshoe is uninstalled or becomes dislodged after installation and is stepped on by said horse hoof, said hollow sheath-overhang of said fastened protective plastic cap folds on itself and deters any accidental penetrating-injury caused to an underside of said horse hoof by said vertically oriented, metallic retaining-clips.

8. The horseshoe as in claim 7 wherein each said protective plastic cap has a top-opening where said hollow sheath-overhang ends.

9. The horseshoe as in claim 7 wherein each said protective plastic cap has a closed end where said hollow sheath-overhang ends.

10. The horseshoe as in claim 7 wherein said plastic cap has a wall thickness of approximately 1/16 inch to 1/8 inch, and a length of said hollow sheath-overhang is approximately 3/8 to 5/8 inch.

11. A horseshoe of the type having a generally U shaped body with a toe region and an open back end, said horseshoe having at least two spaced, metallic retaining-clips projecting vertically upwards from outer sides of the horseshoe substantially in said toe region thereof and preventing unintended dislodging of an installed horseshoe on a horse hoof, each of said metallic retaining-clips being of a first vertical length, wherein each of said metallic retaining-clips includes a protective plastic cap that is a flexible and tough sheath disposed glued to and tightly surrounding all vertical walls of each of said metallic retaining-clips, said sheath having an inside axial length longer than said first vertical length, thus causing a vertical space/gap and a hollow sheath-overhang of said protective plastic cap above a top-tip of each of said metallic retaining-clips, said vertical space/gap having a tapered end at its top and extending in a direction away from a top-tip of each of said metallic retaining-clips and along a longitudinal axis of each of said metallic retaining-clips, whereby, if said horseshoe is uninstalled or becomes dislodged after installation and is stepped on by said horse hoof, said hollow sheath-overhang of said protective plastic cap folds on itself and deters any accidental penetrating-injury to an underside of said horse hoof by said metallic retaining-clips.

12. The horseshoe as in claim 11 wherein each said protective plastic cap has an open end where said hollow sheath-overhang of said sheath ends.

13. The horseshoe as in claim 11 wherein said protective plastic cap has a closed end where said vertical space/gap and said hollow sheath-overhang end.

14. The horseshoe as in claim 11 wherein said protective plastic cap has a wall thickness of approximately 1-3 millimeters, and a length of said hollow sheath-overhang of each said protective plastic cap is approximately 10-15 millimeters.

* * * * *